(12) United States Patent
Haworth et al.

(10) Patent No.: US 8,863,867 B1
(45) Date of Patent: Oct. 21, 2014

(54) COMBINATION MOTORCYCLE CARGO AND MOTORCYCLE HAULING TRAILER

(76) Inventors: William J. Haworth, Hutchinson, MN (US); Donald R. Bryant, Brownton, MN (US)

( * ) Notice: Subject to any disclaimer, the term of this patent is extended or adjusted under 35 U.S.C. 154(b) by 156 days.

(21) Appl. No.: 13/443,622

(22) Filed: Apr. 10, 2012

(51) Int. Cl.
*B62B 1/26* (2006.01)
*B62D 51/04* (2006.01)
*B62D 63/06* (2006.01)

(52) U.S. Cl.
CPC ............ *B62D 63/065* (2013.01); *B62D 63/062* (2013.01)
USPC ......... 180/19.1; 280/30; 280/47.18; 280/47.2

(58) Field of Classification Search
CPC ..... B62D 63/06; B62D 63/062; B62D 63/065
USPC ........ 280/423.1, 409, 400, 456.1, 491.4, 498, 280/511, 460.1, 78
See application file for complete search history.

(56) References Cited

U.S. PATENT DOCUMENTS

| | | | |
|---|---|---|---|
| 5,228,712 A | 7/1993 | Speier | |
| 5,474,320 A * | 12/1995 | Bojarski et al. | 280/5.521 |
| 6,149,181 A * | 11/2000 | Biederman | 280/491.1 |
| 6,612,389 B1 | 9/2003 | Bell | |
| 6,659,491 B2 * | 12/2003 | Green | 280/423.1 |
| 6,955,375 B2 | 10/2005 | Thurm | |
| 7,458,602 B2 * | 12/2008 | Maxwell | 280/656 |

FOREIGN PATENT DOCUMENTS

EP          1889777 A1      2/2008

* cited by examiner

*Primary Examiner* — Joseph M Rocca
*Assistant Examiner* — Jacob Knutson
(74) *Attorney, Agent, or Firm* — Albert W. Watkins (57) ABSTRACT

A lightweight trailer suitable for towing behind a motorcycle is convertible to a trailer operative to transport the motorcycle behind another towing vehicle. An axle slider employs a parallel linkage to easily adjust trailer axle width. The design also shifts the center of gravity of the trailer to provide a balanced load as a motorcycle cargo trailer and as a motorcycle-hauling trailer. To attain the additional length and trailer hitch height necessary for hauling the motorcycle, a frame extension and an offset tongue extension are provided. This offset tongue also provides attachment points for conventional motorcycle tie-down straps. A loading ramp is provided to allow for easy loading of the motorcycle.

13 Claims, 6 Drawing Sheets

COMBINATION MOTORCYCLE CARGO AND MOTORCYCLE HAULING TRAILER

BACKGROUND OF THE INVENTION

1. Field of the Invention

This invention pertains generally to the field of land vehicles, and more particularly to articulated wheeled vehicles that are collapsible and convertible for alternative function. In one preferred manifestation, the present invention pertains to lightweight trailers suitable for towing behind a motorcycle. The dual-purpose trailer provides a lightweight, compact trailer for hauling behind the motorcycle, and converts to a trailer capable of hauling the motorcycle itself in case of motorcycle mechanical failure.

2. Description of the Related Art

During the course of a trip, supplies and accessories are typically desired or required. The transport of this cargo has always presented a dilemma. As man must transport himself, and since he rarely desires to transport the cargo upon his person, some other means is most preferably provided for transport.

With the advent of reliable wheeled transports, wagons and the like became a mainstay for the carrying of cargo. These wagons would frequently have a forward section or seating for persons, and a rear cargo portion. This has evolved into the modern day trailers, automobiles, vans, and trucks, the latter three which also contain an engine and therefore do not depend upon the temperaments of an animal for motive force.

Motorcycles, to which the present invention particularly pertains, have several attributes that are very different from the standard automobile, truck or van. Most particularly, there is very little room for cargo. Side bags are sometimes provided to permit the rider to carry a limited amount of cargo. When this cargo capacity is filled, there is little option. It is not possible or legal to run a second motorcycle behind the first to carry cargo without a rider. Instead, a trailer must be provided, or, much less desirably, a sidecar provided.

The trailer for use with a motorcycle will most desirably have several unique characteristics. The trailer will desirably be both lightweight and small. Lighter weight avoids interfering with the desired acceleration characteristics and handling of the motorcycle, particularly enabling the motorcycle to stop in as short a distance as possible. Motorcycles, with only two wheels in contact with a road surface, can have poorer braking than automobiles and additional trailer weight can aggravate this weakness. Further, a lighter trailer reduces the likelihood of mechanically harming or overloading the motorcycle in any way and instead preserves the native characteristics of the cycle better. Small size assists with streamlining. It is not desirable to place a large aerodynamic drag behind the motorcycle, both for reasons of performance and economy, and also for aesthetic reasons. Consequently, the trailer should have a profile that will resemble that of the motorcycle to at least a reasonable degree, and be as light weight as is reasonably possible or practical.

Several trailers are illustrated in the prior art, the teachings and contents which are incorporated herein by reference, including U.S. Pat. No. 5,228,712 by Speier, entitled "Collapsible motorcycle trailer"; U.S. Pat. No. 6,612,389 by Bell, entitled "Combination trailer and two-wheel conversion utility for a motorcycle"; U.S. Pat. No. 6,955,375 by Thurm, entitled "Vertically stowable modular multi-purpose trailer"; and EP 1,889,777 A1 by Poupalos, entitled "Folding trailer for carrying motorcycles". Of the foregoing, several illustrate wheel channel guides and a variety of ramp structures and tongues, the teachings which are explicitly incorporated herein. However, only Thurm illustrates a trailer capable of carrying both motor vehicles and cargo, but in either case the trailer remains large and encumbered, making it inappropriate for carrying cargo behind a motorcycle.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a combination motorcycle cargo and motorcycle hauling trailer configured for articulated movement adjacent a tow vehicle and traveling in a generally forward direction when being pulled. A trailer tongue terminates at a first end with an articulating coupler and is operative to couple to a tow vehicle. An under-carriage is coupled with the trailer tongue distally to the articulating coupler, and has a longitudinally extensive frame. A load support is coupled with the under-carriage and is operative to support cargo. Running gear has wheels and bearings. An adjustable linkage couples the running gear to the longitudinally extensive frame and load support, and has a first swept back arrangement of the running gear relative to under-carriage operative to support cargo, and a second forward arrangement of running gear relative to under-carriage operative to support a motorcycle. The second forward arrangement positions running gear more nearly adjacent to the articulating coupler than the first swept back arrangement.

In a second manifestation, the invention is a motorcycle cargo and motorcycle hauling trailer. A wheeled running set has at least two wheels. A generally straight trailer tongue extends between an articulating coupling and the wheeled running set. At least two storage arms each have at least one receiver that is operative to receive and securely store a frame extension and offset motorcycle tongue. A motorcycle wheel guide extends along a longitudinal centerline of the motorcycle cargo and motorcycle hauling trailer and immediately adjacent with the at least two storage arms. A loading ramp is stored in an inverted position over the motorcycle wheel guide. A cooler rests upon a bottom of the loading ramp and is operatively secured with tie-down straps and arranged across a center between the at least two wheels, whereby the cooler is balanced along a transverse axis between the at least two wheels, and wherein the cooler does not significantly alter a balance of the motorcycle cargo and motorcycle hauling trailer, regardless of an extent of loading of the cooler. Each of the at least two wheels are carried with pivoting, parallel-linked arms extending from a hub and are pivotal thereon. A slider is secured along a longitudinally extending member and coupled to said pivoting, parallel-linked arms through at least two diagonal braces, and in a first longitudinal location with the slider farther from the articulating coupling an axle width is in a narrow setting, thereby causing the parallel-linked arms to be swept back, and in a second longitudinal location with the slider closer to the articulating coupling than the first longitudinal location an axle width is greater.

OBJECTS OF THE INVENTION

Exemplary embodiments of the present invention solve inadequacies of the prior art by providing a lightweight, compact dual-purpose trailer operative to haul cargo in tow behind a motorcycle. When a motorcycle owner needs to haul more than his motorcycle is designed for, this design provides additional capacity by means of a conventional, extra large cooler. Groceries, camping equipment, fishing equipment and other cargo can be safely and securely hauled while still providing a pleasurable motorcycle experience. In the event of motorcycle mechanical failure, the trailer is quickly converted to a motorcycle-hauling trailer that can be pulled behind any vehicle, including passenger cars, that is equipped with a conventional trailer hitch. The cargo trailer has a suitable size, proportional and not cumbersome, that is easily and safely maneuvered at highway speeds behind any motorcycle with a trailer hitch. The trailer is preferably provided with a wiring harness and stop/tail/turn signals and fenders for safe, legal use on the highway. When converted to haul the motorcycle itself, the beam or axle width is increased to provide greater stability and the overall length is increased to accommodate the motorcycle's wheelbase. All necessary hardware and accessories to perform the conversion are provided in this self-contained unit and no tools are needed for the conversion.

A first object of the invention is to provide a lightweight, small and well-streamlined trailer for use in association with a motorcycle or the like. A second object of the invention is to provide a stable suspension system, which reduces disruption of the cargo and towing vehicle. Another object of the present invention is to facilitate conversion from carrying cargo and being towed by a motorcycle to carrying the motorcycle and being towed by another motor vehicle. A further object of the invention is to ensure that the load is balanced, regardless of whether the load is cargo or a motorcycle. Yet another object of the present invention is to facilitate manual conversion, without the need for tools.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
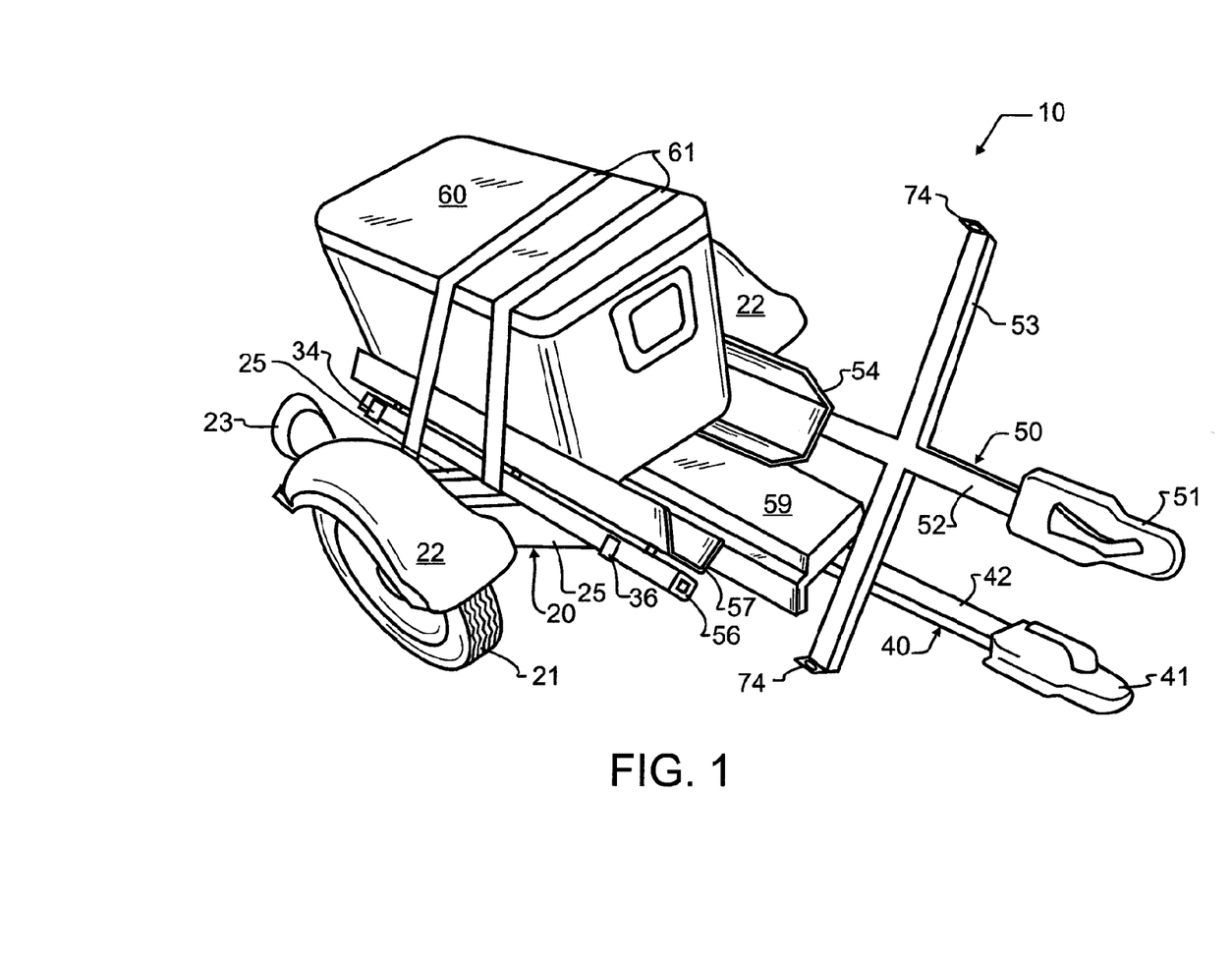
FIG. 1 illustrates a preferred embodiment combination motorcycle cargo and motorcycle hauling trailer designed in accord with the teachings of the present invention from a projected view, configured to transport cargo.
Figure 2:
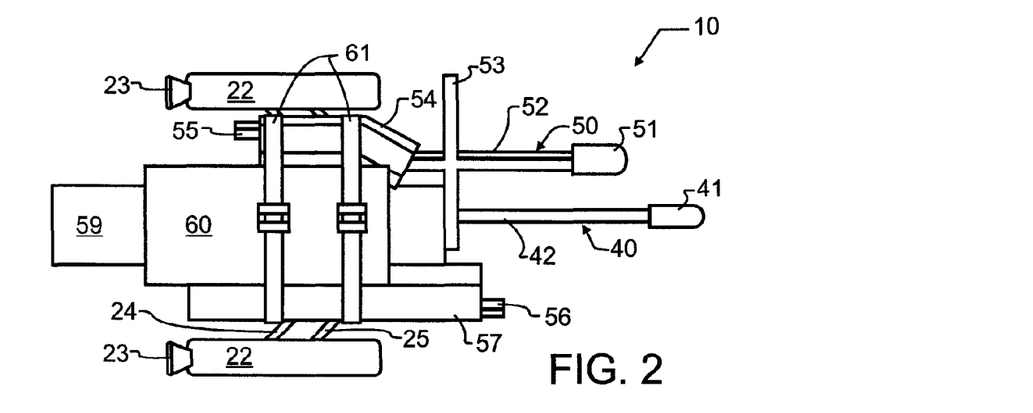
FIG. 2 illustrates the preferred embodiment combination motorcycle cargo and motorcycle hauling trailer of FIG. 1 from a top plan view.
Figure 3:
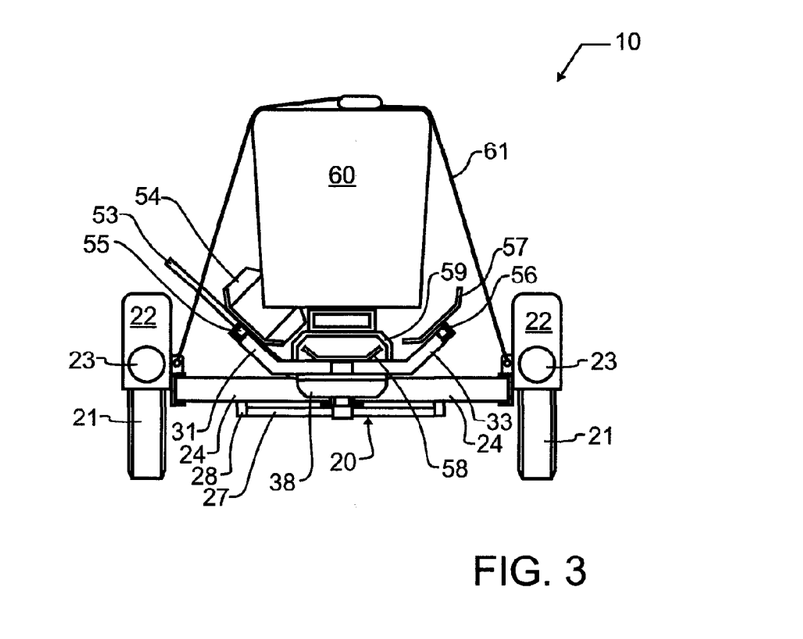
FIG. 3 illustrates the preferred embodiment combination motorcycle cargo and motorcycle hauling trailer of FIG. 1 from an end elevation view.

Manifested in the preferred embodiment combination motorcycle cargo and motorcycle hauling trailer 10, the present invention provides a lightweight trailer suitable for towing behind a motorcycle that is readily manually converted to a trailer operative to transport the motorcycle behind another towing vehicle. As illustrated in FIGS. 1-3, motorcycle cargo and motorcycle hauling trailer 10 has a wheeled running set 20 that supports a coupling 40 including for exemplary purpose a prior art trailer ball coupler 41, and a generally straight trailer tongue 42 extending between ball coupler 41 and running set 20. While a ball coupler 41 is illustrated herein for exemplary purposes as required by the statutes, this is purely for illustration and any suitable articulating coupling may be used in place of ball coupler 41.

Figure 5:
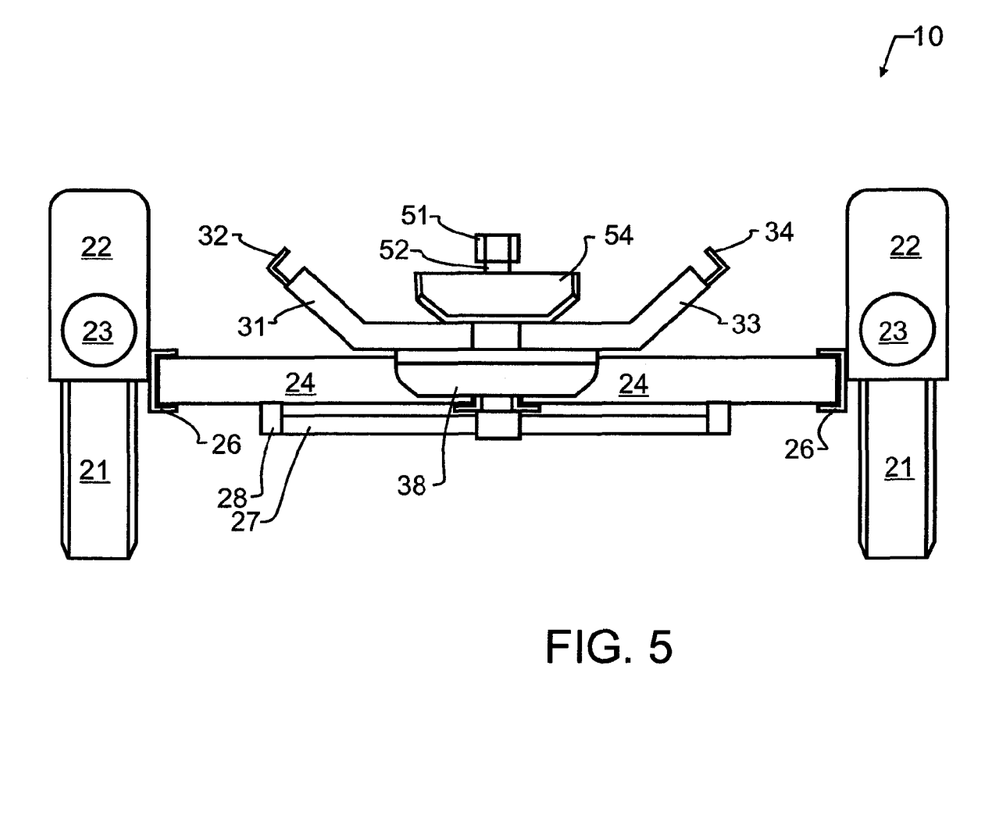
FIG. 5 illustrates the preferred embodiment combination motorcycle cargo and motorcycle hauling trailer of FIG. 1 from an end elevation view, configured to haul a motorcycle.
Figure 6:
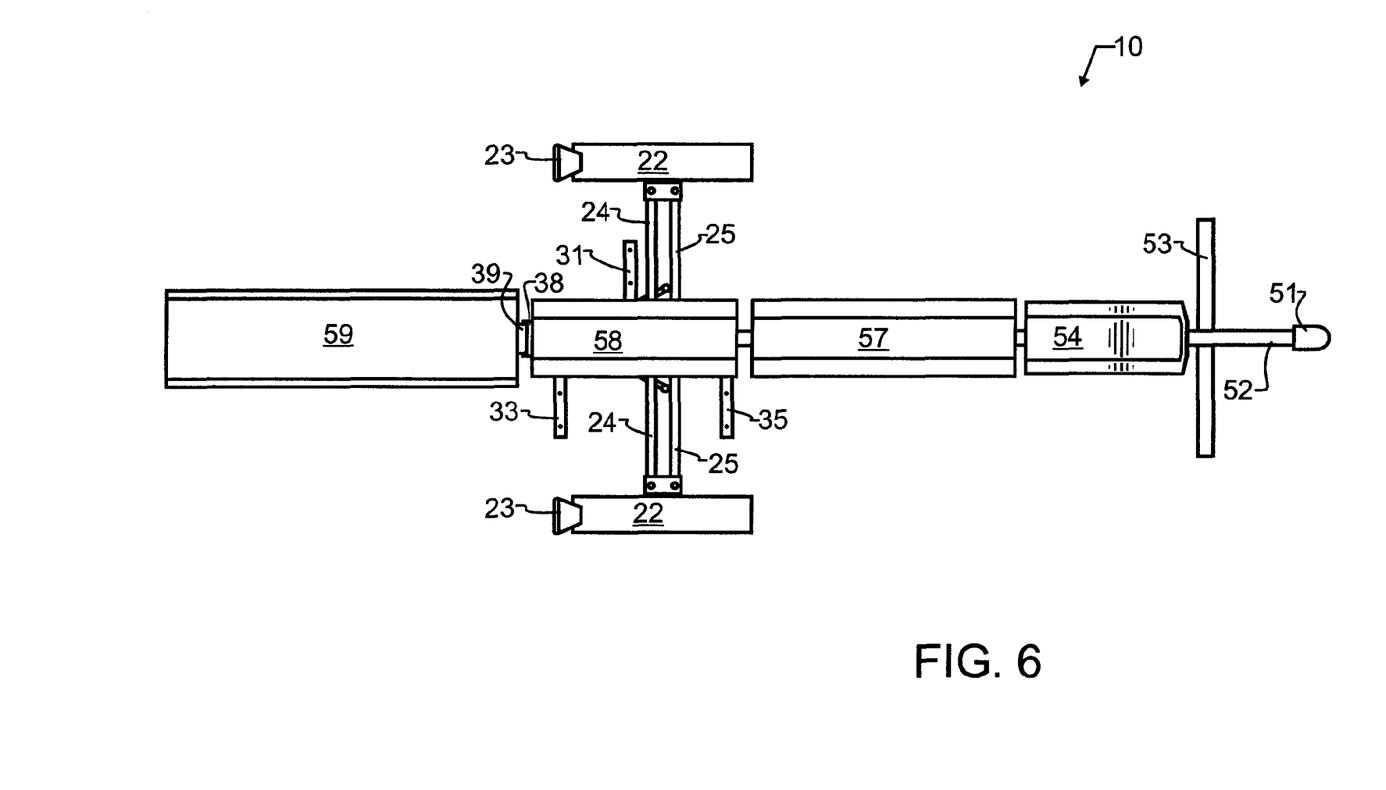
FIG. 6 illustrates the preferred embodiment combination motorcycle cargo and motorcycle hauling trailer of FIG. 5 from a top plan view.

Visible in FIGS. 3, 5 and 6, storage arms 31, 33 and 35 provide receivers 32, 34, 36, respectively, that are designed to receive and securely store frame extension 56 and offset motorcycle tongue 50 when in the cargo configuration of FIGS. 1-3. Extending along the longitudinal centerline of motorcycle cargo and motorcycle hauling trailer 10 and immediately on top of or adjacent with storage arms 31, 33 and 35 is a motorcycle wheel guide 58. A loading ramp 59 in the cargo configuration of FIGS. 1-3 is stored in an inverted position over the top of motorcycle wheel guide 58.

The bottom of loading ramp 59 serves as a base or floor upon which a large cooler 60 may be set and then secured with tie-down straps 61, which for exemplary purposes can be of any suitable type, but as illustrated are ratchet straps. Cooler 60 is arranged across the center between wheels 21, so that cooler 60 is preferably balanced across the wheels. That is, cooler 60 does not significantly alter trailer balance, regardless of extent of loading. While a cooler is illustrated in the preferred embodiment since a cooler offers storage space both thermally and mechanically isolated from the elements, meaning either warm or cold goods may be retained therein, for the purposes of the present disclosure it will be understood that other containers are recognized herein as known equivalents, any which may be substituted for the preferred cooler.

Running set 20 includes left and right wheels 21 that preferably have high-speed wheel bearings and spindles that may, for exemplary purposes, be supported by coil springs as is known in the art. Wheels 21 are carried with pivoting, parallel-linked arms 24, 25 through wheel couplers 26. The geometry of wheel couplers 26 will be determined at least in part by whatever couplings or fasteners are provided on wheels 21. Fenders 22 may optionally be provided to reduce splash and the scattering of debris, and tail and signal lights 23 suspended therefrom.

Figure 4:
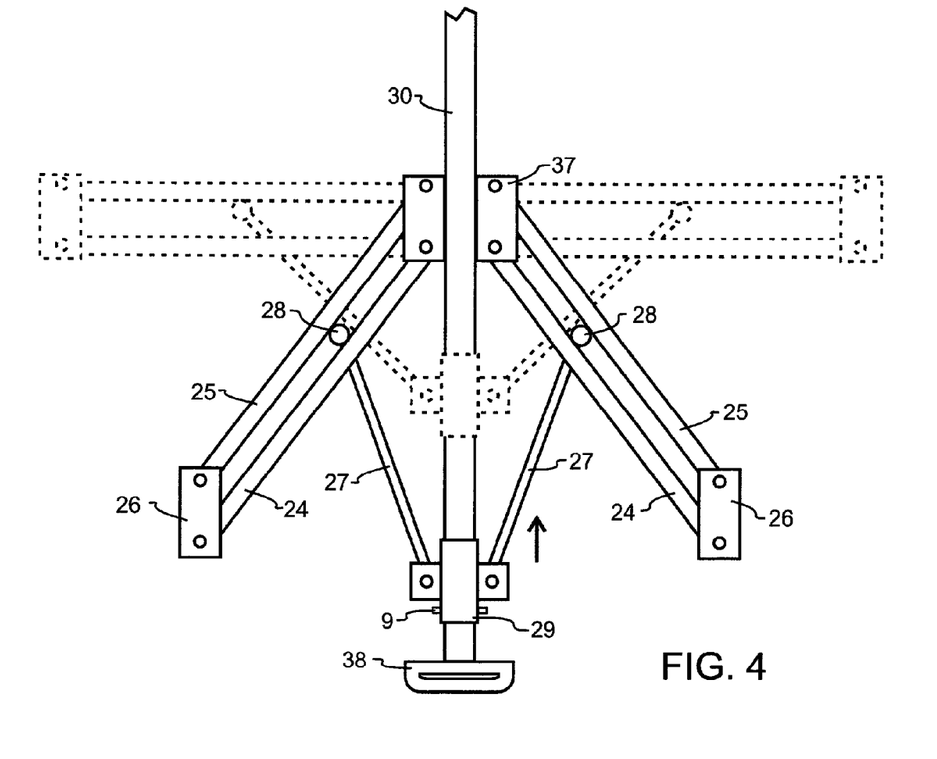
FIG. 4 illustrates a preferred axle adjusting apparatus used in the preferred embodiment combination motorcycle cargo and motorcycle hauling trailer of FIG. 1 from a top plan view, with dashed lines illustrating an alternative position.

Parallel-linked arms 24, 25 in combination with wheel couplers 26 and hub 37, provide a quick, simple, sturdy way to adjust the axle width and trailer balance and tongue weight. Axle width is set by means of a slider 29, visible in FIG. 4, which is secured in either of two locations by means of a conventional lynch pin 9 passing through a transverse hole in slider 29 and a relatively more forward and more rearward transverse holes in longitudinal framing member 30. Slider 29 connects to the main axle via a pair of sliding diagonal braces 27 that are each journaled to one of a pair of bearing members 28 which are each rigidly affixed to one of arms 25. This slider 29 thereby sets the axle width in either of two widths. Similar lynch pins are used to secure frame extension 56 to longitudinal framing member 30 and either of the trailer tongues 40, 50 to longitudinal framing member 30 or to frame extension 56. As a motorcycle cargo trailer, the axle width is adjusted to the narrow setting by sliding slider 29 farther back, or more nearly adjacent to ramp coupler 38, causing parallel-linked arms 24, 25 to be swept back.

Figure 7:
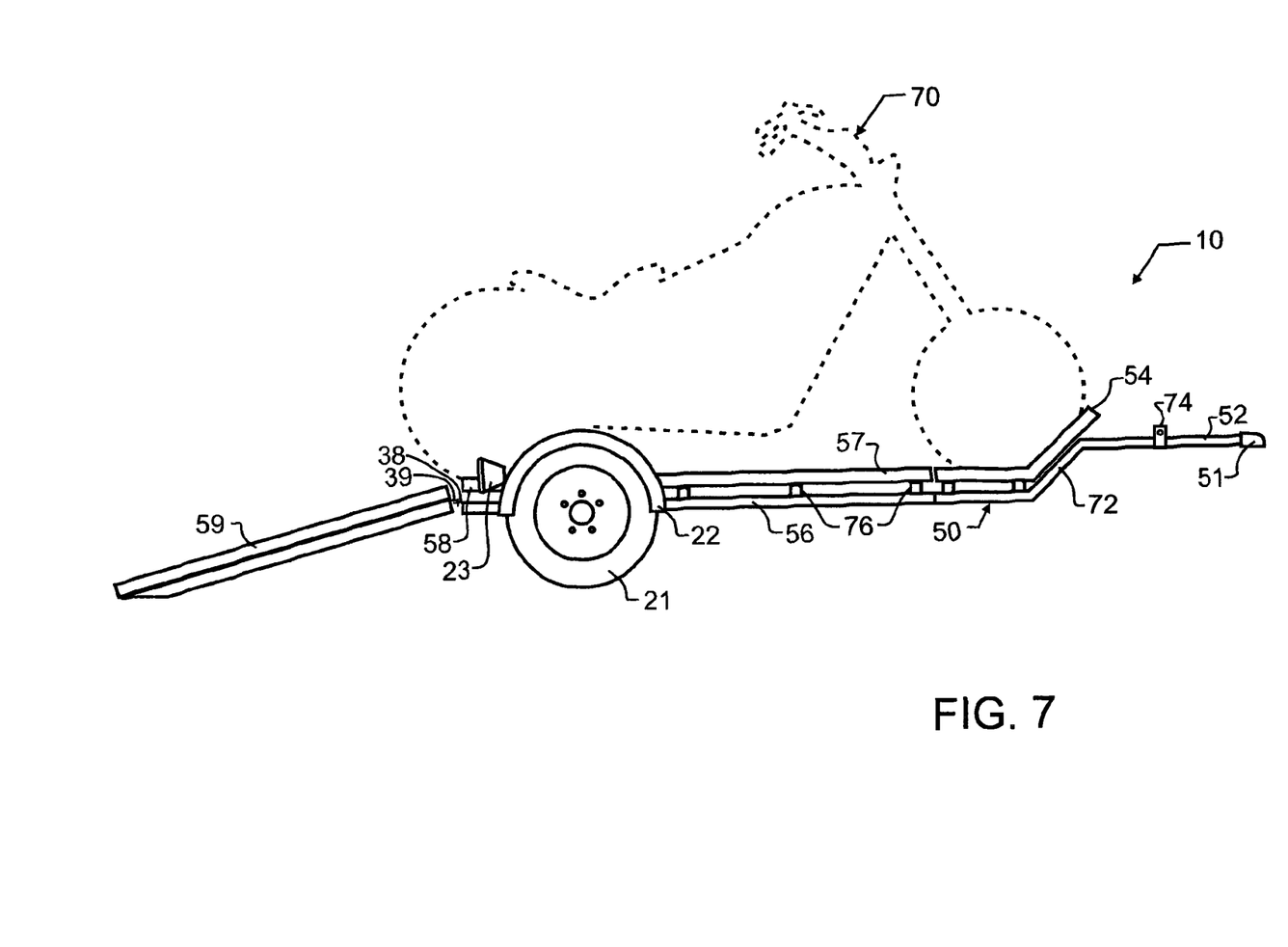
FIG. 7 illustrates the preferred embodiment combination motorcycle cargo and motorcycle hauling trailer of FIG. 5 from a side elevation view.

To convert to a motorcycle-hauling configuration as illustrated in FIGS. 5-7, cooler 60 is removed by loosening tie-down straps 61. The offset tongue 50 and frame extension 56 are removed from their storage arm 31, 33, 35. Cargo trailer tongue 40, which has a straight tongue 42 which is relatively low to the ground for a motorcycle hitch, is removed by removing a lynch pin which secures it. Frame extension 56 and offset tongue 50 may then be installed and secured with lynch pins. The axle width is set to the maximum width by removing the slider 29 lynch pin and moving slider 29 to its forward position, shown by dashed line in FIG. 4. This sweeps the wheels 21 not only wider, but also forward, in turn balancing out the extra forward length created by the insert of frame extension 56. The lynch pin is then inserted into the forward hole, to hold slider 29 in this forward position. Motorcycle cargo and motorcycle hauling trailer 10 can now be attached to a towing vehicle using a common trailer hitch/ ball connection. The offset, created by offset section 72, elevates trailer ball coupler 51 higher than that of trailer ball connector 41, which is appropriate for most towing vehicles.

Holes, sturdy loops, eye bolts or other suitable fastener points 74 are provided to secure conventional motorcycle tie-down straps, so that a motorcycle 70 illustrated in FIG. 7 may be securely anchored between fastener points 74, and, for exemplary purposes, the front wheel or handlebars of motorcycle 70.

Structural elements in motorcycle hauling trailer 10 preferably consist of steel members that are joined by welding, though any suitable strong and weather resistant, coated, treated or painted materials may be used. Where members join together and are pinned, the connection is made via a snug-fitting inner sleeve. This provides support and the lynch pin does not bear any weight.

Aluminum channels 54, 57, 58 are used to guide the motorcycle as it is being loaded and hauled. While aluminum is strong, weather resistant and used to reduce weight, other suitable materials may also be employed. If thinner aluminum is used for the channels 54, 57, 58, transverse strengthening bars 76 may be provided of structural material such as steel, which will also desirably slightly elevate channel 58 above slider 29. However, a wider longitudinal framing member 30, tongue 52, and framing extension 56 or heavier gauge channel may alternatively be provided, as desired.

Safety chains are preferably provided to secure motorcycle cargo and motorcycle hauling trailer 10 to the towing vehicle, as is notoriously well known in the art. A standard electrical connection is preferably provided to couple electricity to trailer lighting 23. Finally, loading ramp 59 has a small tongue 39 that is inserted into the slot provided in ramp coupler 38, and motorcycle 70 can be wheeled up ramp 59 and loaded. A holder 54 for the front wheel is provided so that motorcycle 70 remains upright while tie-down straps are secured. Once motorcycle 70 is secure, ramp 59 may be removed and stowed in a towing vehicle.

As may be apparent, a variety of designs have been contemplated for the present invention, and the invention is not limited to the most preferred version illustrated. In addition, the materials used for a particular design may be chosen not only based upon factors such as strength, weather resistance and weight, but may also factor in the particular design.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A combination motorcycle cargo and motorcycle hauling trailer configured for articulated movement adjacent a tow vehicle and traveling in a generally forward direction when being pulled, comprising:
    a trailer tongue terminating at a first end with an articulating coupler and operative to couple to said tow vehicle;
    an under-carriage coupled with said trailer tongue distally to said articulating coupler and having a longitudinally extensive frame member;
    a load support coupled with said under-carriage and operative to support said cargo;
    running gear having wheels and bearings;
    an adjustable linkage coupling said running gear to said longitudinally extensive frame and said load support having a first swept back arrangement of said running gear relative to said under-carriage operative to support said cargo, and a second forward arrangement of said running gear relative to said under-carriage, said second forward arrangement positioning said running gear more nearly adjacent to said articulating coupler than said first swept back arrangement and operative to support said motorcycle;
    wherein said running gear having wheels and bearings further comprises at least two wheels on opposed sides of said motorcycle cargo and motorcycle hauling trailer; and
    said adjustable linkage further comprising at least two pivoting, parallel-linked arms extending from a hub and pivotal thereon coupling each of said at least two wheels to said under-carriage; and comprising a slider secured along said longitudinally extensive frame member and coupled to said pivoting, parallel-linked arms through at least two diagonal braces; and when said slider is in a first longitudinal location relative to said articulating coupling an axle width is in a narrow setting, thereby causing said parallel-linked arms to be swept back, and when said slider is in a second longitudinal location with said slider relatively closer to said articulating coupling than said first longitudinal location an axle width is greater.

2. The combination motorcycle cargo and motorcycle hauling trailer of claim 1, wherein said trailer tongue extends generally linearly parallel to a trailer longitudinal axis, and is manually detachable from said under-carriage and manually re-attachable thereto.

3. The combination motorcycle cargo and motorcycle hauling trailer of claim 2, further comprising an offset tongue that is non-linear and manually detachable from said under-carriage and manually re-attachable thereto.

4. The combination motorcycle cargo and motorcycle hauling trailer of claim 3, further comprising at least one tongue storage arm coupled to said under-carriage and having at least one receiver that is operative to receive and securely store said offset tongue when said linear trailer tongue is attached to said under-carriage.

5. The combination motorcycle cargo and motorcycle hauling trailer of claim 3, further comprising:
    a frame extension manually attachable between said under-carriage and said offset tongue and manually detachable therefrom;
    at least one frame extension storage arm coupled to said under-carriage and having at least one receiver that is operative to receive and securely store said frame extension when said linear trailer tongue is attached to said under-carriage.

6. The combination motorcycle cargo and motorcycle hauling trailer of claim 1, further comprising a motorcycle wheel guide extending along a longitudinal centerline of said motorcycle cargo and motorcycle hauling trailer and adjacent with said longitudinally extensive frame member.

7. The combination motorcycle cargo and motorcycle hauling trailer of claim 6, further comprising a loading ramp stored in an inverted position over said motorcycle wheel guide.

8. The combination motorcycle cargo and motorcycle hauling trailer of claim 7, further comprising a cooler resting upon a bottom of said loading ramp and operatively secured with tie-down straps, and arranged across a center between said at least two wheels, whereby said cooler is balanced along a transverse axis between said at least two wheels, wherein said cooler does not significantly alter a balance of said motorcycle cargo and motorcycle hauling trailer, regardless of an extent of loading of said cooler.

9. A motorcycle cargo and motorcycle hauling trailer, comprising:
- a wheeled running set having at least two wheels;
- an articulating coupling;
- a generally straight trailer tongue extending between said articulating coupling and said wheeled running set;
- at least two storage arms each having at least one receiver that are operative to receive and securely store a frame extension and offset trailer tongue;
- a motorcycle wheel guide extending along a longitudinal centerline of said motorcycle cargo and motorcycle hauling trailer and immediately adjacent with said at least two storage arms;
- a loading ramp stored in an inverted position over said motorcycle wheel guide;
- a cooler resting upon a bottom of said loading ramp and operatively secured with tie-down straps, and arranged across a center between said at least two wheels, whereby said cooler is balanced along a transverse axis between said at least two wheels, wherein said cooler does not significantly alter a balance of said motorcycle cargo and motorcycle hauling trailer, regardless of an extent of loading of said cooler;
- each of said at least two wheels coupled with pivoting, parallel-linked arms extending from a hub and pivotal thereon;
- a slider secured along a longitudinally extending member and coupled to said pivoting, parallel-linked arms through at least two diagonal braces, and in a first longitudinal location relative to said articulating coupling an axle width is in a narrow setting, thereby causing said parallel-linked arms to be swept back, and in a second longitudinal location with said slider relatively closer to said articulating coupling than said first longitudinal location an axle width is greater.

10. The motorcycle cargo and motorcycle hauling trailer of claim 9, wherein said generally straight trailer tongue and said offset trailer tongue are manually detachable from said wheeled running set and manually re-attachable thereto, whereby said generally straight trailer tongue and said offset trailer tongue are manually interchangeable.

11. The motorcycle cargo and motorcycle hauling trailer of claim 9, wherein said frame extension is manually attachable between said wheeled running set and one of said offset trailer tongue and said generally straight trailer tongue, and is manually detachable therefrom.

12. A combination motorcycle cargo and motorcycle hauling trailer configured for articulated movement adjacent a tow vehicle and traveling in a generally forward direction when being pulled, comprising:
- a trailer tongue terminating at a first end with an articulating coupler and operative to couple to said tow vehicle;
- an under-carriage coupled with said trailer tongue distally to said articulating coupler and having a longitudinally extensive frame member;
- running gear having at least two wheels with bearings;
- a motorcycle wheel guide extending along a longitudinal centerline of said motorcycle cargo and motorcycle hauling trailer and adjacent with said longitudinally extensive frame member;
- a loading ramp stored in an inverted position over said motorcycle wheel guide;
- a load support coupled with said under-carriage and operative to support said cargo;
- a cooler resting upon a bottom of said loading ramp and operatively secured with tie-down straps, and arranged across a center between said at least two wheels, whereby said cooler is balanced along a transverse axis between said at least two wheels, wherein said cooler does not significantly alter a balance of said motorcycle cargo and motorcycle hauling trailer, regardless of an extent of loading of said cooler; and
- an adjustable linkage coupling said running gear to said longitudinally extensive frame and said load support having a first swept back arrangement of said running gear relative to said under-carriage operative to support said cargo, and a second forward arrangement of said running gear relative to said under-carriage, said second forward arrangement positioning said running gear more nearly adjacent to said articulating coupler than said first swept back arrangement and operative to support said motorcycle.

13. A combination motorcycle cargo and motorcycle hauling trailer configured for articulated movement adjacent a tow vehicle and traveling in a generally forward direction when being pulled, comprising:
- a trailer tongue terminating at a first end with an articulating coupler and operative to couple to said tow vehicle;
- an under-carriage coupled with said trailer tongue distally to said articulating coupler and having a longitudinally extensive frame member, said trailer tongue further comprising an offset tongue that is non-linear and extends generally parallel to a trailer longitudinal axis and is manually detachable from said under-carriage and manually re-attachable thereto;
- a load support coupled with said under-carriage and operative to support said cargo;
- a frame extension manually attachable between said under-carriage and said offset tongue and manually detachable therefrom;
- at least one frame extension storage arm coupled to said under-carriage and having at least one receiver that is operative to receive and securely store said frame extension when said linear trailer tongue is attached to said under-carriage.
- running gear having wheels and bearings, and an adjustable linkage coupling said running gear to said longitudinally extensive frame and said load support having a first swept back arrangement of said running gear relative to said under-carriage operative to support said cargo, and a second forward arrangement of said running gear relative to said under-carriage, said second forward arrangement positioning said running gear more nearly adjacent to said articulating coupler than said first swept back arrangement and operative to support said motorcycle.

* * * * *